(12) United States Patent
Sajadi Alamdari et al.

(10) Patent No.: US 12,434,722 B2
(45) Date of Patent: Oct. 7, 2025

(54) METHODS AND SYSTEMS FOR LATERAL CONTROL OF A VEHICLE

(71) Applicant: APTIV TECHNOLOGIES LIMITED, St. Michael (BB)

(72) Inventors: Seyed Amin Sajadi Alamdari, Wuppertal (DE); Anand Vijaykumar, Wuppertal (DE)

(73) Assignee: Aptiv Technologies AG, Schaffhausen (CH)

( * ) Notice: Subject to any disclaimer, the term of this patent is extended or adjusted under 35 U.S.C. 154(b) by 267 days.

(21) Appl. No.: 17/953,568

(22) Filed: Sep. 27, 2022

(65) Prior Publication Data

US 2023/0100742 A1   Mar. 30, 2023

(30) Foreign Application Priority Data

Sep. 29, 2021   (EP) ..................... 21199911

(51) Int. Cl.
*B60W 50/02*   (2012.01)
*B60W 30/02*   (2012.01)
*G05B 13/04*   (2006.01)

(52) U.S. Cl.
CPC ........ *B60W 50/0205* (2013.01); *B60W 30/02* (2013.01); *G05B 13/048* (2013.01); *B60W 2420/403* (2013.01); *B60W 2420/408* (2024.01); *B60W 2420/54* (2013.01)

(58) Field of Classification Search
CPC ............. B60W 50/0205; B60W 30/02; B60W 2420/408; B60W 2420/403; B60W 2420/54; G05B 13/048
See application file for complete search history.

(56) References Cited

U.S. PATENT DOCUMENTS

| 2009/0005889 | A1* | 1/2009 | Sayyar-Rodsari ... G05B 13/048 700/44 |
| 2014/0032049 | A1* | 1/2014 | Moshchuk ............. G08G 1/166 701/42 |
| 2018/0162412 | A1 | 6/2018 | Gao |

(Continued)

FOREIGN PATENT DOCUMENTS

| CN | 102263947 A | 11/2011 |
| CN | 109080631 A | 12/2018 |

(Continued)

OTHER PUBLICATIONS

Mohit Kumar, An Optimal Lateral Trajectory Stabilization of Vehicle using Differential Dynamic Programming, Oct. 2020 (Year: 2020).*

(Continued)

*Primary Examiner* — Erin D Bishop
*Assistant Examiner* — Shivam Sharma
(74) *Attorney, Agent, or Firm* — Miller Johnson

(57) ABSTRACT

A computer implemented method for lateral control of a vehicle comprises the following steps carried out by computer hardware components: determining a location error of the vehicle; determining an orientation error of the vehicle; determining a cost function based on the location error and the orientation error using a circular transformation; and processing the cost function in a model predictive controller to control the vehicle laterally.

11 Claims, 6 Drawing Sheets

(56) References Cited

U.S. PATENT DOCUMENTS

Figure 1:
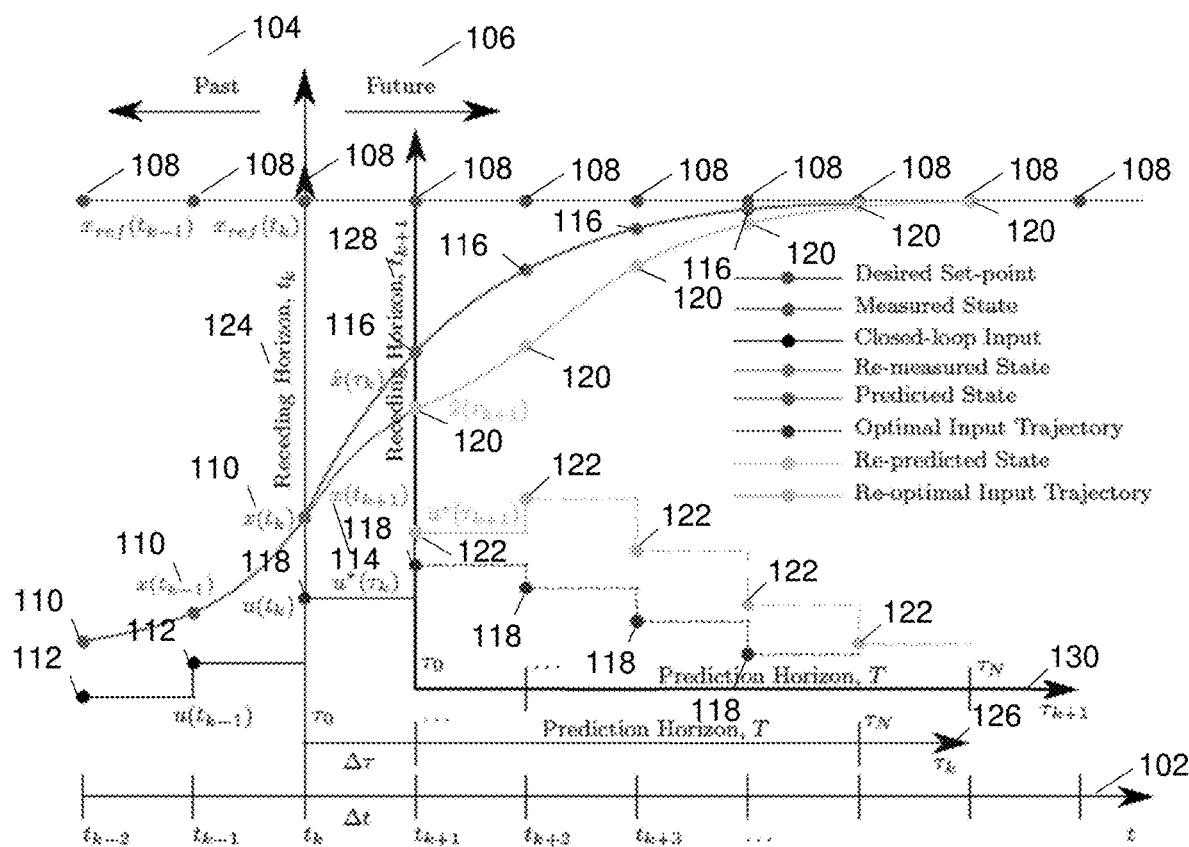

2021/0086832 A1 3/2021 Moshchuk
2021/0291862 A1 9/2021 Jiang

FOREIGN PATENT DOCUMENTS

CN 110027547 A 7/2019
CN 111114522 A 5/2020
EP 3730384 A1 10/2020

OTHER PUBLICATIONS

Keonyup Chu, Local Path Planning for Off-Road Autonomous Driving With Avoidance of Static Obstacles (Year: 2012).*
Adam Houenou, Vehicle Trajectory Prediction based on Motion Model and Maneuver Recognition (Year: 2013).*
Mohit Kumar, et al., "An Optimal Lateral Trajectory Stabilization of Vehicle using Differential Dynamic Programing", IEEE Intelligent Vehicles Symposium (IV), Oct. 2020, pp. 1-8.
Yiheng Lin, et al., "Cross-line-Turn Path Tracking of Intelligent Agricultural Vehicle Based on MPC in Standard Orchard", IEEE, 2018, The 30th Chinese Control and Decision Conference, pp. 1-6.
European Search Report issued by the European Patent Office in connection with International Application No. 21199911.5, dated Mar. 24, 2022.
Chinese Office Action received for CN202211170890.1 dated Aug. 14, 2024, 14 pages.

* cited by examiner

METHODS AND SYSTEMS FOR LATERAL CONTROL OF A VEHICLE

CROSS-REFERENCE TO RELATED APPLICATION

This application claims the benefit of European patent application serial number EP21199911.5 filed on Sep. 29, 2021. The entire contents of which are hereby incorporated by reference herein.

FIELD

The present disclosure relates to methods and systems for lateral control of a vehicle.

BACKGROUND

A lateral control algorithm in an autonomous vehicle is intended to perform lane centering and merge to the center of the lane safely and comfortably.

Accordingly, there is a need for efficient and reliable lateral control.

SUMMARY

The present disclosure provides a computer implemented method, a computer system and a non-transitory computer readable medium according to the independent claims. Embodiments are given in the subclaims, the description and the drawings.

In one aspect, the present disclosure is directed at a computer implemented method for lateral control of a vehicle, the method comprising the following steps performed (in other words: carried out) by computer hardware components: determining a location error of the vehicle; determining an orientation error of the vehicle; determining a cost function based on the location error and the orientation error using a circular transformation; and processing the cost function in a model predictive controller to control the vehicle laterally.

In other words, a lateral control method in an autonomous vehicle is provided to perform lane centering and merge to the center of the lane safely and comfortably.

According to an embodiment, the cost function comprises a non-holonomic ellipsoid cost function.

According to an embodiment, the cost function comprises an integral over an error term, wherein the error term involves both the location error and the orientation error.

According to an embodiment, the error term comprises a product based on the location error and the orientation error.

According to an embodiment, the cost function is based on a cosine function.

According to an embodiment, the cost function is based on a sine function.

According to an embodiment, the cost function is based on a tangent function.

According to an embodiment, the cost function is determined according to equations (2) and (3).

According to an embodiment, controlling the vehicle laterally comprises determining a lateral offset of the vehicle.

According to an embodiment, controlling the vehicle laterally comprises determining an orientation error of the vehicle.

According to an embodiment, controlling the vehicle laterally comprises determining an optimal steering angle value.

Obtaining a cost function for the model predictive control in order to calculate the steering wheel angle comprises determining a lateral offset and an orientation error of the vehicle w.r.t the lane center. The result of this compensation is a more human like steering and harmonized cost function within the controller.

In another aspect, the present disclosure is directed at a computer system, said computer system comprising a plurality of computer hardware components configured to carry out several or all steps of the computer implemented method described herein. The computer system can be part of a vehicle.

In another aspect, the present disclosure is directed at a vehicle comprising the computer system as described herein and a sensor configured to determine the location error and/or the orientation error.

According to an embodiment, the sensor comprises at least one of a radar sensor, a lidar sensor, an ultrasound sensor, a camera, or a global navigation satellite system sensor.

The computer system may comprise a plurality of computer hardware components (for example a processor, for example processing unit or processing network, at least one memory, for example memory unit or memory network, and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

The methods, devices and systems as described herein may be used for advanced driver assistance system (ADAS).

DRAWINGS

Figure 2:
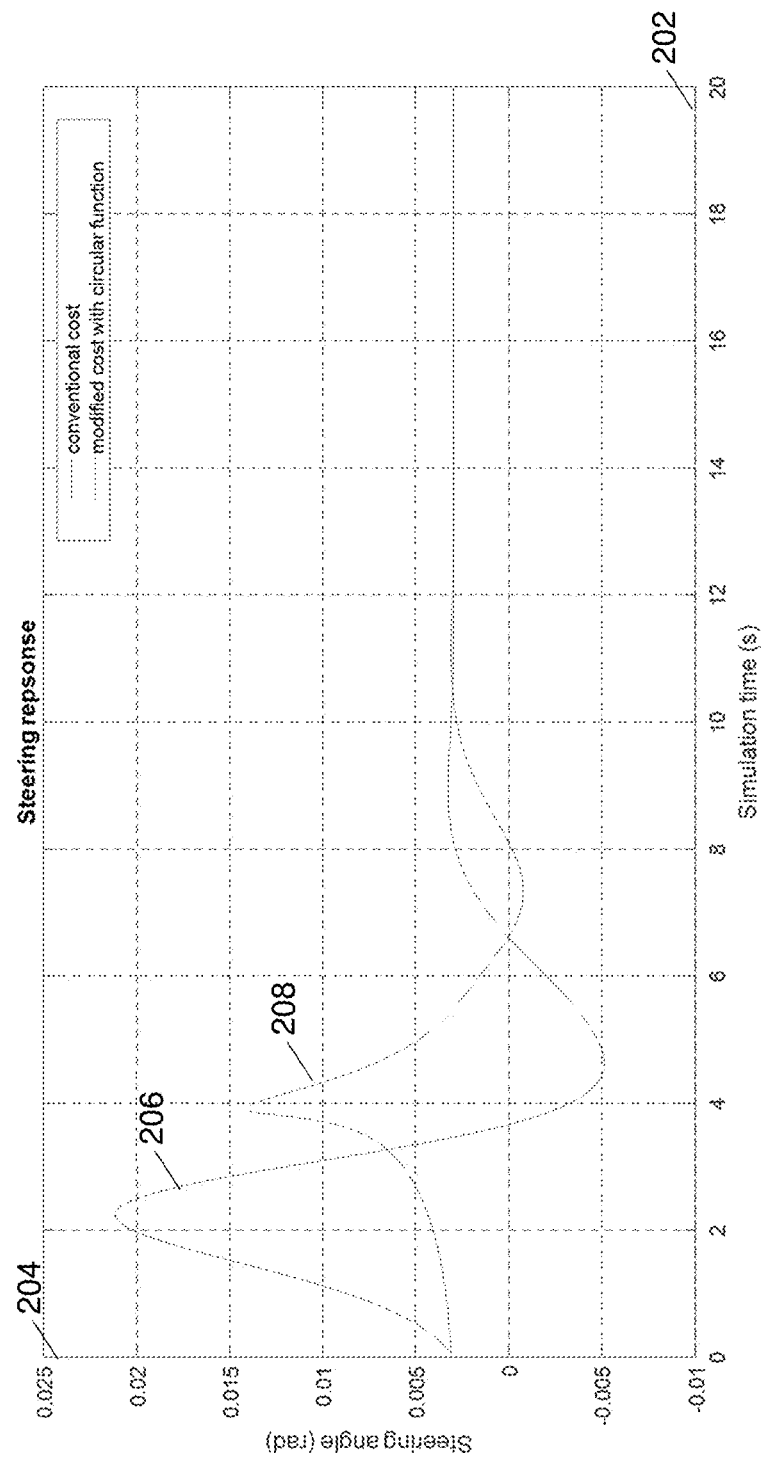
Figure 3:
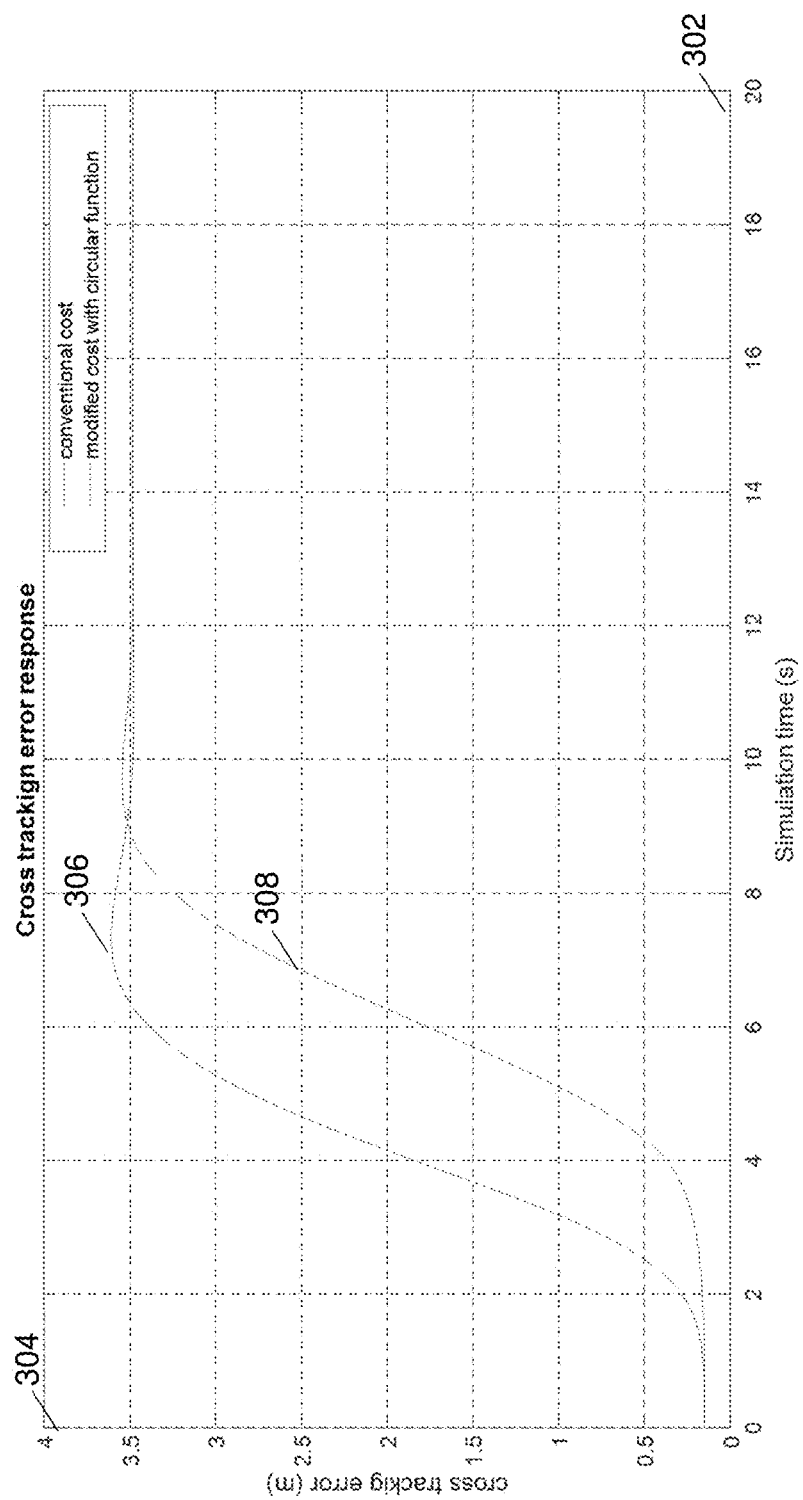
Figure 4:
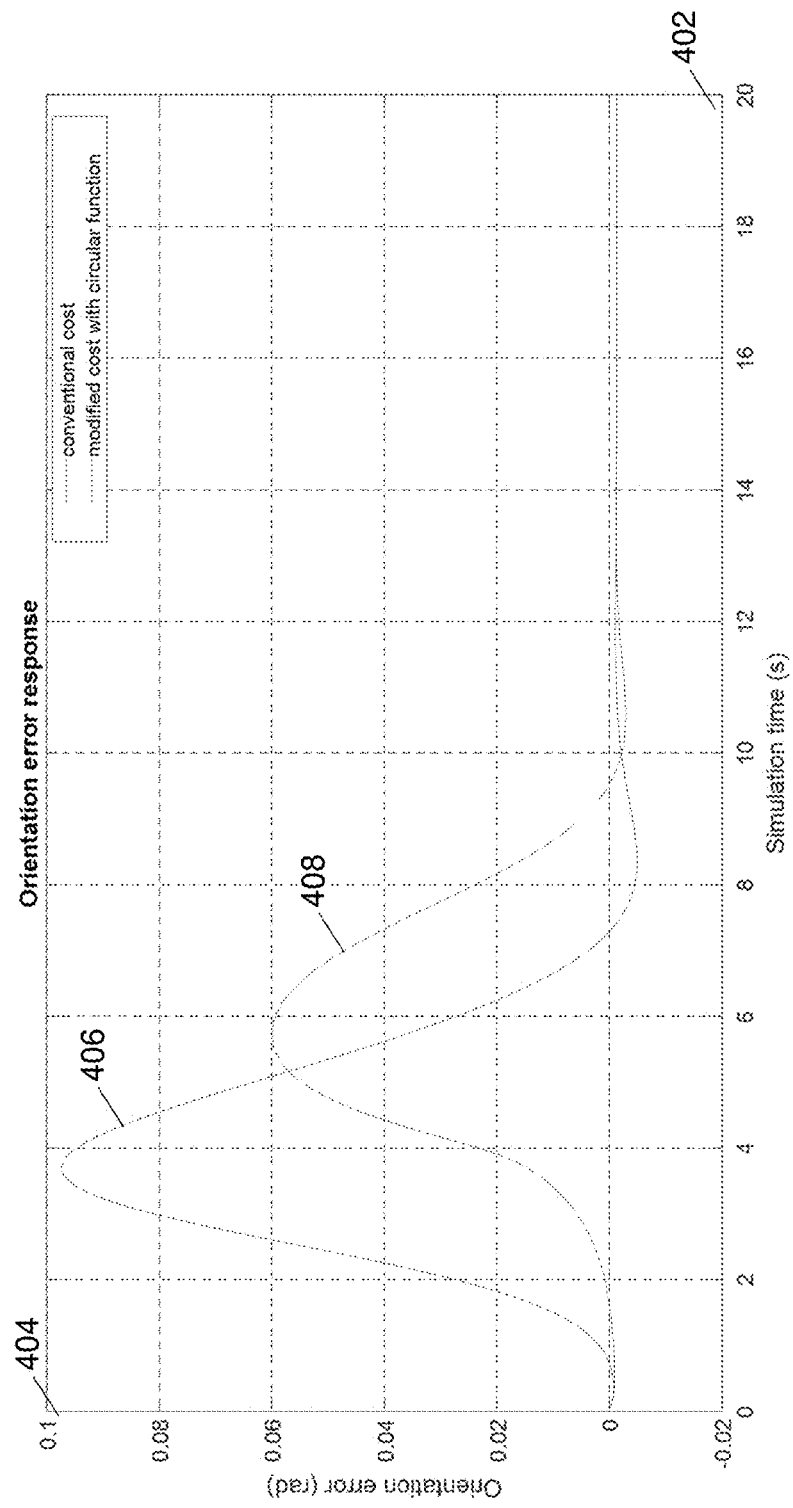
Figure 5:
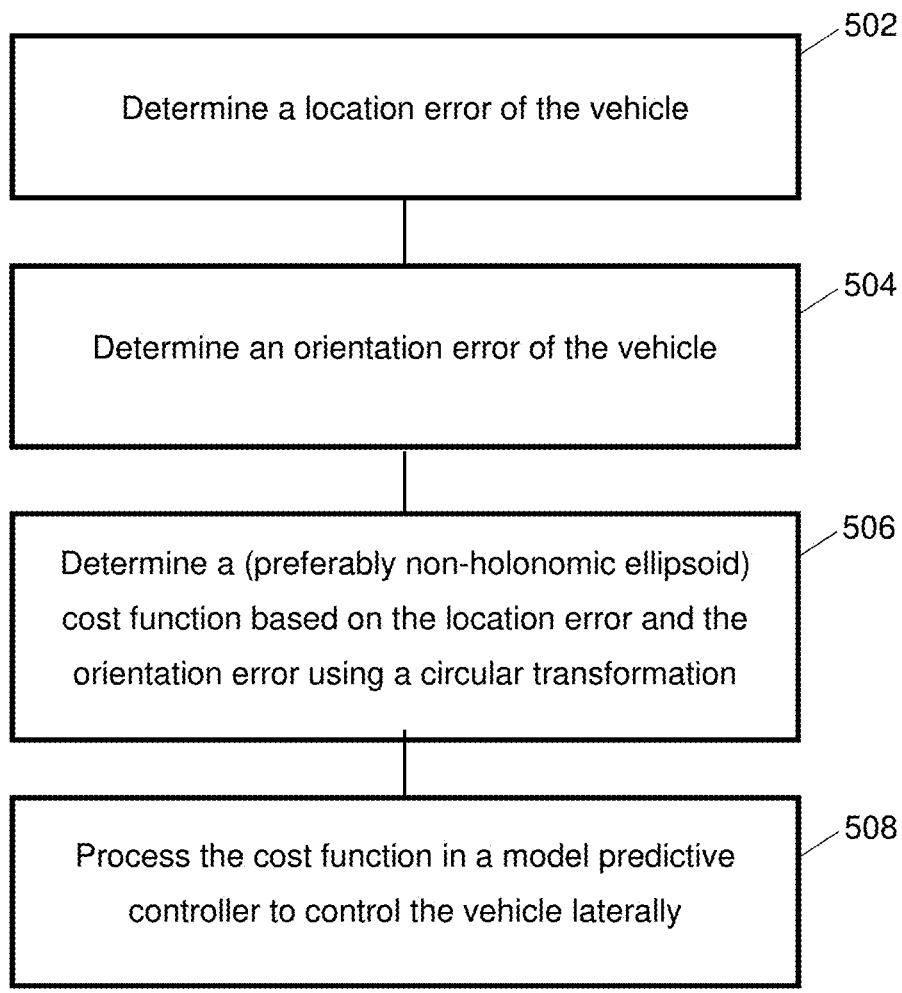
Figure 6:
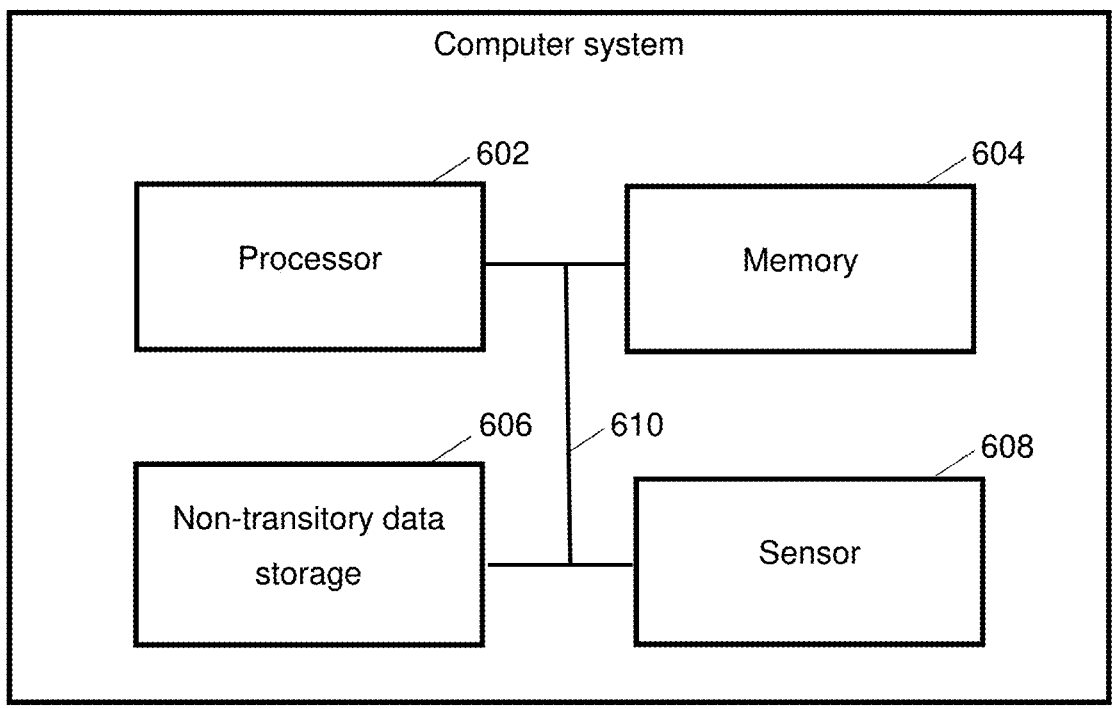

Exemplary embodiments and functions of the present disclosure are described herein in conjunction with the following drawings, showing schematically:

FIG. 1 a model predictive controller according to various embodiments;

FIG. 2 a steering response comparison between different cost functions;

FIG. 3 a cross tracking error comparison between different cost functions;

FIG. 4 an orientation error comparison between different cost functions;

FIG. 5 a flow diagram illustrating a method for lateral control of a vehicle according to various embodiments; and FIG. 6 a computer system with a plurality of computer hardware components configured to carry out steps of a computer implemented method for lateral control of a vehicle according to various embodiments.

DETAILED DESCRIPTION

Autonomously driving vehicles do not only have to observe a safe distant to vehicles and other objects in front of and behind the vehicle, but also to the side. This may be done by determining the lateral distance between the center of the lane and the host vehicle According to various embodiments, a mathematical cost function is provided in order for a model predictive controller to minimize the lateral distance and provide an optimal solution. With regard to this, the cost function may include an ellipsoid function which includes the lateral offset and orientation error of the vehicle w.r.t. the lane center. Based on this cost function, the system dynamics and the constraints imposed, the model predictive controller may provide an optimum steering wheel angle for the lateral control of the vehicle. The result of this compensation may resemble human like steering and harmonized cost function within the controller.

According to various embodiments, devices and methods for lateral control of a vehicle utilizing a specific cost function approach to the model predictive controller may be provided.

FIG. 1 shows an illustration 100 of a model predictive controller.

Model predictive controller may be a powerful controller. As the name indicates, the controller may predict the state of the vehicle, for example the lateral offset from reference and orientation error w.r.t reference of vehicle for a finite Horizon time (T). The reference value for the vehicle may be calculated by a planning block, and then introduce this value to a Model Predictive Control (MPC), such that it compensates the error by generating a control signal at the current time instance.

In FIG. 1, a time axis 102 (with past time 104 and future time 106), the desired set-point 108, measured states 110, closed-loop input 112, re-measured state 114, predicted states 116, optimal input trajectory 118, re-predicted state 120, and re-optimal input trajectory 122 are illustrated. A receding horizon ($t_k$) 124 and a corresponding prediction horizon (T) 126 are shown. A receding horizon ($t_{k+1}$) 128 and a corresponding prediction horizon (T) 130 are shown.

The following symbols may be used:
$t_k$—Current time step;
t—time axis forward in time;
T—Prediction horizon (duration of prediction of states);
$\Delta t$—Sampling period;
$u^*(\tau_k)$—Optimal control value at the current time step;
$x_{ref}(t_k)$—reference trajectory for states;
$\hat{x}(\tau)$—Predicted states.

The cost function according to various embodiments may be used by the optimizer in the model predictive controller to provide the optimal control value at the current time step. In this case, the steering angle may be the optimal control signal sequence (u*) that is used to actuate the vehicle in order to minimize error of orientation and lateral offset (states of the system). Based on the system dynamics and the cost functions designed, the predictions of trajectory may also be calculated. The obtained control sequence may be the motion control sequence that can be applied to the vehicle.

One approach for minimizing the cross tracking error and orientation w.r.t the reference may be introducing these terms in the cost function as shown below:

$$J=\int_0^T (d-d_{ref})^2 * k_d + (\theta_e)^2 * k_\theta \quad (1)$$

In formula (1):
J represents the cost function that needs to be minimized;
d represents the initial value of the lateral offset obtained from vehicle sensor input;
$d_{ref}$ represents the reference value that vehicle should track, for example the lane center;
$k_d$ represents the tuning gain on minimizing the cross tracking error;
$\theta_e$ represents the orientation error w.r.t to reference, for example the lane center; and
$k_\theta$ represents the tuning gain on minimizing the orientation error.

A drawback of such a cost is that the cross tracking error and the orientation error cannot be compensated at the same time. This may cause contradicting behavior in the evaluation of the cost and therefore the steering command generated from the MPC is suboptimum set leading to poor steering performance.

According to various embodiments, a different approach to the cost function of equation (1) may be provided. According to various embodiments, the orientation and cross tracking error may be mapped into a single tracking error signal by using a circular transformation. Therefore, this tracking signal may be used in the cost as a conventional quadratic term. The axes of the circle may be scaled by the orientation and the cross tracking error and therefore unified based on orientation error units (radian)

The equations (2) and (3) below shows the modified cost function according to various embodiments:

$$e_{tr}=\cos\theta_e^2 * \tan^{-1}(d-d_{ref}) + \sin\theta_e^2 * \theta_e \quad (2)$$

$$J=\int_0^T e_{tr}^2 \quad (3)$$

The various variables in equation (2) are identical to the variables described with reference to equation (1) above.

Equations (2) and (3) provide a non-holonomic ellipsoid cost function for model predictive control according to various embodiments.

In the following, graphs and plots showing the comparison between the steering performance of the cost function according to equation (1) and the cost function according to equation (2) and (3) are shown. The use case for the plots below is to have a lane change like behavior where the required lateral offset from an initial offset is approximately the lane width (3.5 m in this case). The set speed for the vehicle may be 36 m/s.

FIG. 2 shows an illustration 200 of how the steering response has a much smoother rise and also significantly lower amplitude for the same maneuver. This in practical test would result in a comfortable lane change for the passenger. A horizontal axis 202 indicates time, and a vertical axis 204 indicates the steering angle. Curve 206 results from using the cost function of equation (1), and curve 208 results from using the cost function of equations (2) and (3).

FIG. 3 shows an illustration 300 of the comparison between the lateral offset for both cases and how the cost (function) according to equations (2) and (3) makes the rate of lateral offset smaller than the conventional, again resulting in a smoother maneuver. Also, a difference could be noted in the overshoots between the plots suggesting that the cost according to equations (2) and (3) has a smaller overshoot for the same maneuver as compared to the cost function according to equation (1). A horizontal axis 302 indicates time, and a vertical axis 304 indicates the cross tracking error. Curve 306 results from using the cost function of equation (1), and curve 308 results from using the cost function of equations (2) and (3).

FIG. 4 shows an illustration 400 of the difference in orientation errors. This may have a significant difference where the compensation of the error with the modified cost is far better than the conventional. A horizontal axis 402 indicates time, and a vertical axis 404 indicates the orientation error. Curve 406 results from using the cost function of equation (1), and curve 408 results from using the cost function of equations (2) and (3).

FIG. 5 shows a flow diagram 500 illustrating a flow diagram illustrating a method for lateral control of a vehicle according to various embodiments. At 502, a location error of the vehicle may be determined. At 504, an orientation error of the vehicle may be determined. At 506, a cost function based on the location error and the orientation error using a circular transformation may be determined. At 508, the cost function may be processed in a model predictive controller to control the vehicle laterally.

The errors may be measured w.r.t. (with respect to; or relative to) the lane center.

The cost function (which may be a non-holonomic cost function) may be used in the model predictive controller to calculate the optimal steering angle. This steering angle may be used for the lateral control of the vehicle.

According to various embodiments, the cost function may include or may be a non-holonomic ellipsoid cost function.

According to various embodiments, the cost function may include or may be an integral over an error term, wherein the error term involves both the location error and the orientation error. The integral may be an integral according to equation (3).

According to various embodiments, the error term may include or may be a product based on the location error and the orientation error.

According to various embodiments, the cost function (or the error term) may be based on a cosine function.

According to various embodiments, the cost function (or the error term) may be based on a sine function.

According to various embodiments, the cost function (or the error term) may be based on a tangent function.

According to various embodiments, the cost function may be determined according to equations (2) and (3). According to various embodiments, the error term may be determined according to equation (2).

According to various embodiments, controlling the vehicle laterally may include or may be determining a lateral offset of the vehicle.

According to various embodiments, controlling the vehicle laterally may include or may be determining an orientation error of the vehicle.

According to various embodiments, wherein controlling the vehicle laterally may include or may be determining an optimal steering angle value.

According to various embodiments, the cost for MPC may be obtained from the mentioned errors to calculate the optimal steering angle value for lateral control.

Each of the steps 502, 504, 506, 508 and the further steps described above may be performed by computer hardware components.

FIG. 6 shows a computer system 600 with a plurality of computer hardware components configured to carry out steps of a computer implemented method for lateral control of a vehicle according to various embodiments. The computer system 600 may include a processor 602, a memory 604, and a non-transitory data storage 606. A sensor 608 may be provided as part of the computer system 600 (like illustrated in FIG. 6), or may be provided external to the computer system 600.

The processor 602 may carry out instructions provided in the memory 604. The non-transitory data storage 606 may store a computer program, including the instructions that may be transferred to the memory 604 and then executed by the processor 602. The sensor 608 may be used for determining the location error and/or the orientation error.

The processor 602, the memory 604, and the non-transitory data storage 606 may be coupled with each other, e.g. via an electrical connection 610, such as e.g. a cable or a computer bus or via any other suitable electrical connection to exchange electrical signals. The sensor 608 may be coupled to the computer system 600, for example via an external interface, or may be provided as parts of the computer system (in other words: internal to the computer system, for example coupled via the electrical connection 610).

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the computer system 600.

REFERENCE NUMERAL LIST 100 model predictive controller according to various embodiments
102 time axis
104 past time
106 future time
108 desired set-point
110 measured states
112 closed-loop input
114 re-measured state
116 predicted states
118 optimal input trajectory
120 re-predicted state
122 re-optimal input trajectory
124 receding horizon
126 prediction horizon
128 receding horizon
130 prediction horizon
200 steering response comparison between different cost functions
202 horizontal axis
204 vertical axis
206 curve
208 curve
300 cross tracking error comparison between different cost functions
302 horizontal axis
304 vertical axis
306 curve
308 curve
400 orientation error comparison between different cost functions 402 horizontal axis
404 vertical axis
406 curve
408 curve
500 flow diagram illustrating a method for lateral control of a vehicle
according to various embodiments
502 step of determining a location error of the vehicle
504 step of determining an orientation error of the vehicle
506 step of determining a cost function based on the location error and
the orientation error using a circular transformation
508 step of processing the cost function in a model predictive controller to
control the vehicle laterally
600 computer system according to various embodiments
602 processor
604 memory
606 non-transitory data storage
608 sensor
610 connection

The invention claimed is:

1. A computer-implemented method for lateral control of a vehicle, the computer-implemented method being carried out by computer hardware components and comprising:
determining a location error of the vehicle;
determining an orientation error of the vehicle;
determining a cost function based on the location error and the orientation error using a circular transformation; and
processing the cost function in a model predictive controller to control the vehicle laterally, wherein:
the cost function includes an integral over an error term,
the error term involves both the location error and the orientation error,
the error term includes a product based on the location error and the orientation error,
the cost function is determined according to equations (a) and (b):

$$e_{tr} = \cos\theta_e^2 * \tan^{-1}(d - d_{ref}) + \sin\theta_e^2 * \theta_e \quad \text{(a)}$$

$$J = \int_0^T e_{tr}^2 \quad \text{(b)}$$

$\theta_e$ represents the orientation error with respect to a reference,
d represents an initial value of a lateral offset from a vehicle sensor input,
$d_{ref}$ represents a reference value that the vehicle should track,
J represents the cost function that needs to be minimized, and
T represents a prediction horizon.

2. The computer-implemented method of claim 1, wherein the cost function comprises a non-holonomic ellipsoid cost function.

3. The computer-implemented method of claim 1, wherein the cost function is based on a cosine function.

4. The computer-implemented method of claim 1, wherein the cost function is based on a sine function.

5. The computer-implemented method of claim 1, wherein the cost function is based on a tangent function.

6. The computer-implemented method of claim 1, wherein controlling the vehicle laterally comprises determining the lateral offset of the vehicle.

7. The computer-implemented method of claim 1, wherein controlling the vehicle laterally comprises determining an optimal steering angle value.

8. A computer system comprising a plurality of computer hardware components configured to carry out instructions including:
determining a location error of a vehicle;
determining an orientation error of the vehicle;
determining a cost function based on the location error and the orientation error using a circular transformation; and
processing the cost function in a model predictive controller to control the vehicle laterally, wherein:
the cost function includes an integral over an error term,
the error term involves both the location error and the orientation error,
the error term includes a product based on the location error and the orientation error,
the cost function is determined according to equations (a) and (b):

$$e_{tr} = \cos\theta_e^2 * \tan^{-1}(d - d_{ref}) + \sin\theta_e^2 * \theta_e \quad \text{(a)}$$

$$J = \int_0^T e_{tr}^2 \quad \text{(b)}$$

$\theta_e$ represents the orientation error with respect to a reference,
d represents an initial value of a lateral offset from a vehicle sensor input,
$d_{ref}$ represents a reference value that the vehicle should track,
J represents the cost function that needs to be minimized, and
T represents a prediction horizon.

9. A vehicle comprising:
the computer system of claim 8; and
a sensor configured to determine the location error and/or the orientation error.

10. The vehicle of claim 9, wherein the sensor comprises at least one of a radar sensor, a lidar sensor, an ultrasound sensor, a camera, or a global navigation satellite system sensor.

11. A non-transitory computer readable medium comprising instructions including:
determining a location error of a vehicle;
determining an orientation error of the vehicle;
determining a cost function based on the location error and the orientation error using a circular transformation; and
processing the cost function in a model predictive controller to control the vehicle laterally, wherein:
the cost function includes an integral over an error term, the error term involves both the location error and the orientation error,
the error term includes a product based on the location error and the orientation error,
the cost function is determined according to equations (a) and (b):

$$e_{tr} = \cos\theta_e^2 * \tan^{-1}(d - d_{ref}) + \sin\theta_e^2 * \theta_e \quad \text{(a)}$$

$$J = \int_0^T e_{tr}^2 \quad \text{(b)}$$

$\theta_e$ represents the orientation error with respect to a reference,
d represents an initial value of a lateral offset from a vehicle sensor input, $d_{ref}$ represents a reference value that the vehicle should track, J represents the cost function that needs to be minimized, and T represents a prediction horizon.

* * * * *